United States Patent
Kwon et al.

(10) Patent No.: US 9,403,978 B2
(45) Date of Patent: Aug. 2, 2016

(54) THERMOPLASTIC RESIN COMPOSITION AND MOLDED ARTICLE USING THE SAME

(71) Applicant: Cheil Industries Inc., Gumi-si (KR)

(72) Inventors: Kee-Hae Kwon, Uiwang-si (KR); In-Chol Kim, Uiwang-si (KR); Bo-Eun Kim, Uiwang-si (KR); Joo-Hyun Jang, Uiwang-si (KR); Chang-Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 49 days.

(21) Appl. No.: 14/097,538

(22) Filed: Dec. 5, 2013

(65) Prior Publication Data

US 2014/0187717 A1    Jul. 3, 2014

(30) Foreign Application Priority Data

Dec. 28, 2012 (KR) ........................ 10-2012-0157575

(51) Int. Cl.
| | |
|---|---|
| *C08L 69/00* | (2006.01) |
| *C08L 51/00* | (2006.01) |
| *C08L 25/12* | (2006.01) |
| *C08L 51/04* | (2006.01) |
| *C08L 83/04* | (2006.01) |

(52) U.S. Cl.
CPC ................. *C08L 69/00* (2013.01); *C08L 25/12* (2013.01); *C08L 51/04* (2013.01); *C08L 83/04* (2013.01)

(58) Field of Classification Search
None
See application file for complete search history.

(56) References Cited

U.S. PATENT DOCUMENTS

| | | | |
|---|---|---|---|
| 4,460,742 A | | 7/1984 | Kishida et al. |
| 5,475,053 A | * | 12/1995 | Niessner et al. ........ C08L 51/04 525/279 |
| 6,423,767 B1 | * | 7/2002 | Weber et al. .................. 524/158 |
| 8,557,912 B2 | | 10/2013 | Chung et al. |
| 8,735,490 B2 | | 5/2014 | Chung et al. |
| 2011/0003918 A1 | * | 1/2011 | Eckel et al. .................... 524/127 |
| 2011/0157866 A1 | * | 6/2011 | Li et al. ............................ 362/84 |
| 2011/0160377 A1 | * | 6/2011 | Chung et al. .................. 524/504 |

FOREIGN PATENT DOCUMENTS

| | | |
|---|---|---|
| CN | 102115564 A | 7/2011 |
| CN | 102329462 A | 1/2012 |
| KR | 10-2003-0095537 A | 12/2003 |
| KR | 10-0666797 B1 | 1/2007 |
| KR | 10-2011-0079489 A | 7/2011 |
| KR | 10-2012-0006839 A | 1/2012 |
| KR | 10-2012-0078417 A | 7/2012 |

OTHER PUBLICATIONS

Baek et al., electronic translation of KR 10-666797, Jan. 2007.*
Search Report in counterpart Chinese Application No. 201310737841.6 dated Apr. 22, 2015, pp. 1-2.

* cited by examiner

*Primary Examiner* — Jeffrey Mullis
(74) *Attorney, Agent, or Firm* — Additon, Higgins & Pendleton, P.A.

(57) ABSTRACT

A thermoplastic resin composition comprises (A) about 30 to about 98 wt % of a polycarbonate resin, (B) about 1 to about 50 wt % of a rubber modified acrylic-based graft copolymer, and (C) about 1 to about 69 wt % of a branched copolymer including silicon-based compound. A molded article can be made using the same.

10 Claims, No Drawings

THERMOPLASTIC RESIN COMPOSITION AND MOLDED ARTICLE USING THE SAME

CROSS-REFERENCE TO RELATED APPLICATION

This application claims priority to and the benefit of Korean Patent Application No. 10-2012-0157575 filed in the Korean Intellectual Property Office on Dec. 28, 2012, the entire disclosure of which is incorporated herein by reference.

FIELD OF THE INVENTION

A thermoplastic resin composition and a molded article using the same are disclosed.

BACKGROUND OF THE INVENTION

A thermoplastic resin has improved properties such as lower specific gravity than glass or metal and improved formability, impact resistance, and the like. Recently, as various products have become larger, thermoplastic resins have replaced conventional glass and/or metal to reduce the weight of the products and to reduce costs. Thermoplastic resins have been widely used, for example, in the manufacture of products ranging from electric/electronic products to auto parts.

Recently, a low gloss resin has been increasingly required to meet increasing demand for a non-painted resin. For example, there has been an increased demand for a material having low gloss or no gloss characteristics for use as an environmentally-friendly and cost-cutting interior/exterior auto/electric/electronic material and in particular, a low gloss product satisfying customers' demand for a high-quality appearance of an auto interior material.

Since an auto interior material requires excellent weather resistance/light resistance as well as excellent heat resistance and impact strength, a mixed resin of a polycarbonate resin having excellent heat resistance and impact strength and a rubber modified acrylic-based graft copolymer having excellent weather resistance/light resistance and formability is widely used.

The mixed resin can be used as an auto interior material due to its excellent properties and weather resistance. There is still a need, however, for a low gloss resin to realize high-quality appearance without painting. U.S. Pat. No. 4,460,742 discloses a low gloss composition prepared by adding a copolymer cross-linked by an allyl functional group.

Many low gloss resins are prepared by adding rubber particles having a large diameter or a matting agent to the resin or by injection molding the resin composition using a particular corrosion mold selected to decrease gloss.

Sufficient low gloss effects may be obtained using large amounts of the rubber particles having a large diameter or the matting agent. Using large amounts of the rubber particle having a large diameter or the matting agent may, however, deteriorate properties such as impact strength and the like.

In addition, using a corrosion mold can increase costs because different molds are required depending on the degree of gloss. Further, it can be difficult to adjust the gloss as needed.

Further, rubber particles having a large diameter can have limited weather and/or light resistance. Accordingly, a matting agent is mainly added to the resin to decrease gloss. The matting agent, however, can deteriorate properties such as impact strength, heat resistance, and the like when used in the large amounts required to provide sufficient low gloss characteristics.

SUMMARY OF THE INVENTION

One embodiment of the present invention provides a thermoplastic resin composition that can have excellent impact strength, fluidity, and/or light resistance and which is capable of exhibiting excellent low gloss characteristics despite using no matting agent or a matting agent in a small amount and a molded article using the same.

In one embodiment of the present invention, a thermoplastic resin composition comprises (A) about 30 to about 98 wt % of a polycarbonate resin, (B) about 1 to about 50 wt % of a rubber modified acrylic-based graft copolymer, and (C) about 1 to about 69 wt % of a branched copolymer including a silicon-based compound.

The branched copolymer including a silicon-based compound (C) may be a copolymer prepared by copolymerizing (c1) about 10 to about 85 wt % of an aromatic vinyl-based monomer; (c2) about 10 to about 85 wt % of an unsaturated nitrile-based monomer; and (c3) about 0.1 to about 20 wt % of a silicon-based compound including at least two unsaturated reactive groups based on the total amount of the branched copolymer including a silicon-based compound (C), or a mixture of the copolymer.

The aromatic vinyl-based monomer (c1) may include styrene, p-methylstyrene, α-methylstyrene, halogen- and/or C1-C10 alkyl-substituted styrene, or a combination thereof.

The unsaturated nitrile-based monomer (c2) may include acrylonitrile, methacrylonitrile, ethacrylonitrile, phenylacrylonitrile, α-chloroacrylonitrile, or a combination thereof.

The silicon-based compound including at least two unsaturated reactive groups may include one or more silicon-based compounds represented by the following Chemical Formula 2.

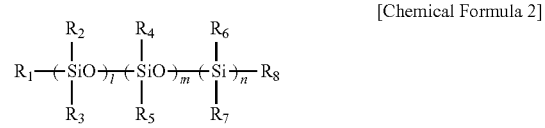

[Chemical Formula 2]

In the above Chemical Formula 2, l, m, and n are the same or different and are each independently an integer ranging from 0 to 100, with the proviso that l, m, and n are not 0 simultaneously, $R_1$ to $R_8$ are the same or different and are each independently hydrogen, substituted or unsubstituted C1 to C30 alkyl, substituted or unsubstituted C2 to C30 alkenyl, substituted or unsubstituted C2 to C30 alkynyl, substituted or unsubstituted C3 to C30 cycloalkyl, substituted or unsubstituted C6 to C30 aryl, substituted or unsubstituted C1 to C30 heteroaryl, a hydroxy group, alkoxy, an amino group, an amide group, an epoxy group, a carboxyl group, halogen, an ester group, an isocyanate group, or a mercapto group, and at least two of the $R_1$ to $R_8$ include a polymerizable unsaturated reactive group.

The silicon-based compound including at least two unsaturated reactive groups may include dimethoxymethylvinylsilane, diethoxymethylvinylsilane, diacetoxy methylvinylsilane, 1,1,1,3,5,5,5-heptamethyl-3-vinyltrisiloxane, 2,4,6,8-tetramethyl-2,4,6,8-tetravinylcyclotetrasiloxane, α,ω-divinyl polydimethylsiloxane, vinyl-modified dimethylsiloxane, or a combination thereof.

A weight average molecular weight of the branched copolymer including a silicon-based compound (C) may be about 50,000 to about 5,000,000 g/mol.

The thermoplastic resin composition may further include a styrene-based copolymer (D).

The thermoplastic resin composition may further include a matting agent (E).

The thermoplastic resin composition may have gloss of about 10 to about 60% at about 60°.

The thermoplastic resin composition may have ΔE of about 0 to about 2.0 measured by using SAE J1885 standards under an exposure condition of 42 MJ/m² in order to evaluate light resistance.

In another embodiment of the present invention, a molded article using the thermoplastic resin composition is provided.

The thermoplastic resin composition and the molded article using the same may have excellent impact strength, fluidity, and/or light resistance and can exhibit excellent low gloss characteristic even though a matting agent is not used or is used in a small amount.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "substituted" refers to one substituted with a C1 to C30 alkyl group; C1 to C10 alkylsilyl group; a C3 to C30 cycloalkyl group; a C6 to C30 aryl group; a C2 to C30 heteroaryl group; a C1 to C10 alkoxy group; a fluoro group; a C1 to C10 trifluoroalkyl group such as a trifluoromethyl group and the like; a cyano group, or a combination thereof, in place of at least one hydrogen of a compound.

As used herein, when a definition is not otherwise provided, the term "hetero" may refer to one including 1 to 3 heteroatoms including N, O, S, P, or a combination thereof, in place of one or more carbons in a compound or a substituent.

As used herein, when a definition is not otherwise provided, the term "alkyl group" may refer to a "saturated alkyl group" without an alkene group or an alkyne group; or an "unsaturated alkyl group" including at least one of an alkene group and an alkyne group. The term "alkene group" may refer to a substituent in which at least two carbon atoms are bound with at least one carbon-carbon double bond, and the term "alkyne group" refers to a substituent in which at least two carbon atoms are bound with at least one carbon-carbon triple bond. The alkyl group may be a branched, linear, or cyclic alkyl group.

The alkyl group may be a C1 to C20 alkyl group, for example C1 to C6 lower alkyl group, a C7 to C10 middle alkyl group, or a C11 to C20 higher alkyl group.

The term "aromatic group" may refer a compound including a cyclic structure where all elements have p-orbitals which form conjugation. An aryl group and a heteroaryl group may be exemplified.

The term "aryl group" may refer to a monocyclic or fused ring-containing polycyclic (i.e., rings sharing adjacent pairs of carbon atoms) groups.

The term "heteroaryl group" may refer to one including 1 to 3 heteroatoms including N, O, S, and/or P in an aryl group, and remaining carbons. When the heteroaryl group is a fused ring, each ring may include 1 to 3 heteroatoms.

As used herein, when a specific definition is not otherwise provided, (meth)acrylate denotes acrylate or methacrylate. The (meth)acrylic acid alkyl ester refers to acrylic acid alkyl ester or methacrylic acid alkyl ester, and (meth)acrylic acid ester refers to acrylic acid ester or methacrylic acid ester.

As used herein, when a definition is not otherwise provided, the "copolymerization" may refer to a block copolymerization, random copolymerization, graft copolymerization, or alternating copolymerization, and the term "copolymer" may refer to a block copolymer, random copolymer, graft copolymer, or alternating copolymer.

In one embodiment of the present invention, a thermoplastic resin composition includes (A) about 30 to about 98 wt % of a polycarbonate resin, (B) about 1 to about 50 wt % of a rubber modified acrylic-based graft copolymer, and (C) about 1 to about 69 wt % of a branched copolymer including silicon-based compound.

Hereinafter, each component of the thermoplastic resin composition is described in detail.

(A) Polycarbonate Resin

The polycarbonate resin may be prepared by reacting one or more diphenols represented by the following Chemical Formula 1 with a phosgene, halogenic acid ester, carbonate ester, or a combination thereof.

[Chemical Formula 1]

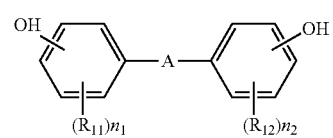

In the above Chemical Formula 1, A is a single bond, substituted or unsubstituted C1 to C30 alkylene, substituted or unsubstituted C2 to C30 alkenylene, substituted or unsubstituted C2 to C30 alkylidene, substituted or unsubstituted C1 to C30 haloalkylene, substituted or unsubstituted C5 to C30 cycloalkylene, substituted or unsubstituted C6 to C30 arylene, substituted or unsubstituted C1 to C20 alkoxylene, a halogenic acid ester group, a carbonate ester group, —CO—, —S—, or —SO₂—, $R_{11}$ and $R_{12}$ are the same or different and are each independently substituted or unsubstituted C1 to C30 alkyl or substituted or unsubstituted C6 to C30 aryl, and $n_1$ and $n_2$ are the same or different and are each independently integers ranging from 0 to 4.

Two or more kinds of the diphenols represented by the above Chemical Formula 1 may be combined to constitute a repeating unit of a polycarbonate resin. Examples of the diphenols may include without limitation hydroquinone, resorcinol, 4,4'-dihydroxydiphenyl, 2,2-bis(4-hydroxyphenyl)propane (referred to be as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. In exemplary embodiments, 2,2-bis(4-hydroxyphenyl)propane, 2,2-bis(3,5-dichloro-4-hydroxyphenyl)propane and/or 1,1-bis(4-hydroxyphenyl)cyclohexane may be used, for example 2,2-bis(4-hydroxyphenyl)propane may be used.

The polycarbonate resin may be a mixture of copolymers obtained using two or more dipenols that differ from each other. The polycarbonate resin may also include a linear polycarbonate resin, a branched polycarbonate resin, a polyestercarbonate copolymer resin, and the like or a combination thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with one or more diphenols and a carbonate. The multi-functional aromatic compound may be included in an amount of about 0.05 to about 2 mol % based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like, and combinations thereof.

The polycarbonate resin may have a weight average molecular weight of about 15,000 g/mol to about 35,000 g/mol, for example about 20,000 to about 30,000 g/mol, and as another example about 20,000 to about 28,000 g/mol, without limitation. When the polycarbonate resin has a weight average molecular weight within the above range, viscosity can decrease and fluidity can increase, and thus a desired appearance may be effectively realized.

The thermoplastic resin composition may include the polycarbonate resin in an amount of about 30 to about 98 wt %, for example about 40 to about 98 wt %, and as another example about 50 to about 98 wt %, based on the total amount (total weight) of the thermoplastic resin composition. In some embodiments, the thermoplastic resin composition may include the polycarbonate resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 wt %. Further, according to some embodiments of the present invention, the amount of the polycarbonate resin can be in a range from about any of the foregoing amounts to about any other of the foregoing amounts.

When the thermoplastic resin composition includes the polycarbonate resin in an amount within the above range, a thermoplastic resin composition including the same may have improved impact strength, light resistance, and/or appearance characteristics.

(B) Rubber Modified Acrylic-Based Graft Copolymer

The rubber modified acrylic-based graft copolymer is obtained by grafting a polymer of an aromatic vinyl monomer and an unsaturated nitrile monomer on an acrylic-based rubber.

The acrylic-based rubber may include a (meth)acrylic acid alkyl ester monomer and/or a (meth)acrylic acid ester monomer. As used herein, the term alkyl may refer to C1 to C10 alkyl. Examples of the (meth)acrylic acid alkyl ester monomer may include without limitation methyl(meth)acrylate, ethyl(meth)acrylate, butyl(meth)acrylate, and the like, and combinations thereof.

The acrylic-based rubber may be copolymerized with one or more kinds of other radically polymerizable monomers such as but not limited to styrene. The one or more kinds of other radically polymerizable monomers may be used in an amount of about 5 to about 30 wt %, for example about 10 to about 20 wt %, based on the total amount (total weight) of the acrylic-based rubber.

Examples of the aromatic vinyl monomer may include without limitation styrene, o-ethylstyrene, m-ethylstyrene, p-ethylstyrene, α-methylstyrene, and the like, and combinations thereof.

Examples of the unsaturated nitrile monomer may include without limitation acrylonitrile, methacrylonitrile, ethacrylonitrile, and the like, and combinations thereof.

The rubber modified acrylic-based graft copolymer may be prepared by any method that is known to a person skilled in the art. For example, an acrylic-based rubbery polymer can be prepared to form one or more cores, and then an aromatic vinyl monomer and an unsaturated nitrile monomer can be graft-copolymerized thereon to form a one or more shell layers.

The rubber modified acrylic-based graft copolymer may include the acrylic-based rubber in an amount of about 10 to about 70 wt %, for example about 20 to about 70 wt %, as another example about 30 to about 70 wt %, as another example about 40 to about 70 wt %, as another example about 20 to about 60 wt %, as another example about 30 to about 60 wt %, and as another example about 40 to about 60 wt %, based on 100 wt % of the rubber modified acrylic-based graft copolymer. In some embodiments, the rubber modified acrylic-based graft copolymer may include the acrylic-based rubber in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the acrylic-based rubber can be in a range from about any of the foregoing amounts to about any other of the foregoing amounts.

Accordingly, the rubber modified acrylic-based graft copolymer may include the aromatic vinyl monomer and unsaturated nitrile monomer in a total amount of about 30 to about 90 wt %, for example about 30 to about 80 wt %, as another example about 30 to about 70 wt %, as another example about 30 to about 60 wt %, as another example about 40 to about 80 wt %, as another example about 40 to about 70 wt %, and as another example about 40 to about 60 wt %, based on 100 wt % of the acrylic-based graft copolymer.

In some embodiments, the rubber modified acrylic-based graft copolymer may include the aromatic vinyl monomer and unsaturated nitrile monomer in a total amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the total amount of the aromatic vinyl monomer and unsaturated nitrile monomer can be in a range from about any of the foregoing amounts to about any other of the foregoing amounts.

When the total amounts of the acrylic-based rubber, aromatic vinyl monomer and unsaturated nitrile monomer are within the above ranges, the thermoplastic resin composition including the same may exhibit a balance of impact strength, light resistance, and the like.

An average particle diameter of the rubber modified acrylic-based graft copolymer may be about 50 to about 1,000 nm, for example about 100 to about 500 nm, and as another example about 150 to about 400 nm. Within this range, the thermoplastic resin composition including the same may exhibit a balance of impact strength, light resistance, and the like.

The thermoplastic resin composition may include the rubber modified acrylic-based graft copolymer in an amount of about 1 to about 50 wt %, for example about 1 to about 40 wt %, and as another example about 1 to about 30 wt %, based on the total amount (total weight) of the thermoplastic resin composition. In some embodiments, the thermoplastic resin composition may include the rubber modified acrylic-based graft copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the rubber modified acrylic-based graft copolymer can be in a range from about any of the foregoing amounts to about any other of the foregoing amounts.

When the thermoplastic resin composition includes the rubber modified acrylic-based graft copolymer in an amount within the above range, the thermoplastic resin composition may have properties such as excellent impact strength, fluidity, light resistance, and the like.

(C) Branched Copolymer Including Silicon-Based Compound

The branched copolymer including a silicon-based compound (C) may be a copolymer prepared by copolymerizing (c1) about 10 to about 85 wt % of an aromatic vinyl-based monomer; (c2) about 10 to about 85 wt % of an unsaturated nitrile-based monomer; and (c3) about 0.1 to about 20 wt % of a silicon-based compound including at least two unsaturated reactive groups, or a mixture of such copolymers.

This branched copolymer (C) may be prepared in a conventional polymerization method well known in a related art, for example, mass polymerization, emulsion polymerization, suspension polymerization, and the like.

The branched copolymer including silicon-based compound (C) includes a silicon-based compound having a high molecular weight during the copolymerization, which can improve impact resistance of a resin and simultaneously having a branched structure, which can improve fluidity.

Examples of the aromatic vinyl-based monomer (c1) may include without limitation styrene, p-methylstyrene, α-methylstyrene, halogen- and/or C1-C10 alkyl-substituted styrene, and the like, and mixtures thereof.

The branched copolymer (C) may include the aromatic vinyl-based monomer (c1) in an amount of about 10 to about 85 wt %, for example about 20 to about 85 wt %, as another example about 30 to about 85 wt %, as another example about 40 to about 85 wt %, and as another example about 40 to about 80 wt %, based on the total amount (total weight) of the branched copolymer (C). In some embodiments, the branched copolymer (C) may include the aromatic vinyl-based monomer (c1) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments of the present invention, the amount of the aromatic vinyl-based monomer (c1) can be in a range from about any of the foregoing amounts to about any other of the foregoing amounts.

When the branched copolymer (C) includes the aromatic vinyl-based monomer (c1) in an amount within the above range, the branched copolymer (C) may ensure excellent impact resistance and fluidity.

Examples of the unsaturated nitrile-based monomer (c2) may include without limitation acrylonitrile, methacrylonitrile, ethacrylonitrile, phenylacrylonitrile, α-chloroacrylonitrile, and the like, and mixtures thereof.

The branched copolymer (C) may include the unsaturated nitrile-based monomer (c2) in an amount of about 10 to about 85 wt %, for example about 10 to about 80 wt %, as another example about 10 to about 70 wt %, as another example about 10 to about 60 wt %, and as another example about 10 to about 50 wt % based on the total amount (total weight) of the branched copolymer (C). In some embodiments, the branched copolymer (C) may include the unsaturated nitrile-based monomer (c2) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments of the present invention, the amount of the unsaturated nitrile-based monomer (c2) can be in a range from about any of the foregoing amounts to about any other of the foregoing amounts.

The silicon-based compound including at least two unsaturated reactive groups may include a silicon-based compound represented by the following Chemical Formula 2, singly or in a mixture of two or more.

[Chemical Formula 2]

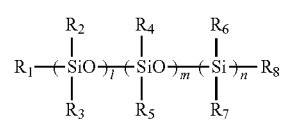

In the above Chemical Formula 2, l, m, and n are the same or different and are each independently an integer ranging from 0 to 100, with the proviso that l, m, and n are not 0 simultaneously.

$R_1$ to $R_8$ are the same or different and are each independently hydrogen, substituted or unsubstituted C1 to C30 alkyl, substituted or unsubstituted C2 to C30 alkenyl, substituted or unsubstituted C2 to C30 alkynyl, substituted or unsubstituted C3 to C30 cycloalkyl, substituted or unsubstituted C6 to C30 aryl, substituted or unsubstituted C1 to C30 heteroaryl, a hydroxy group, alkoxy, an amino group, an amide group, an epoxy group, a carboxyl group, halogen, an ester group, an isocyanate group, or a mercapto group, and at least two of the $R_1$ to $R_8$ include a polymerizable unsaturated reactive group, and have a linear or cyclic (bond of $R_1$ to $R_8$) structure.

Specific examples of the silicon-based compound including at least two unsaturated reactive groups may include without limitation dimethoxymethylvinylsilane, diethoxymethylvinylsilane, diacetoxy methylvinylsilane, 1,1,1,3,5,5,5-heptamethyl-3-vinyltrisiloxane, 2,4,6,8-tetramethyl-2,4,6,8-tetravinylcyclotetrasiloxane, α,ω-divinyl polydimethylsiloxane, vinyl-modified dimethylsiloxane, and the like. These may be used singularly or in a mixture thereof.

The branched copolymer (C) may include the silicon-based compound including at least two unsaturated reactive groups in an amount of about 0.1 to about 20 wt %, for example about 0.1 to about 18 wt %, as another example about 0.1 to about 16 wt %, as another example about 0.1 to about 14 wt %, as another example about 0.1 to about 12 wt %, as another example about 0.1 to about 10 wt %, as another example about 0.1 to about 8 wt %, and as another example about 0.1 to about 6 wt %, based on the total amount (total weight) of the branched copolymer including a silicon-based compound (C). In some embodiments, the branched copolymer (C) may include the silicon-based compound including at least two unsaturated reactive groups in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. Further, according to some embodiments of the present invention, the amount of the silicon-based compound including at least two unsaturated reactive groups can be in a range from about any of the foregoing amounts to about any other of the foregoing amounts.

In this case, the thermoplastic resin composition may exhibit excellent impact strength and light resistance and simultaneously, may exhibit excellent low gloss characteristics even though a matting agent is not used or used in a small amount.

The viscosity of the silicon-based compound including at least two unsaturated reactive groups may be less than or equal to about 500 cPs, for example about 50 to about 500 cPs, and as another example about 50 to about 300 cPs.

The vinyl functional group content of the silicon-based compound (c3) may be about 0.05 to about 10 mmol/g, for example about 0.1 to about 5 mmol/g.

The weight average molecular weight of the branched copolymer including a silicon-based compound (C) may be about 50,000 to about 5,000,000 g/mol. When the branched copolymer including silicon-based compound (C) has a weight average molecular weight within the above range, a thermoplastic resin composition may maintain excellent conventional properties and simultaneously, increase fluidity and impact resistance. As used herein, the weight average molecular weight is a molecular weight reduced to polystyrene measured by using gel permeation chromatography.

The thermoplastic resin composition may include the branched copolymer including a silicon-based compound (C) in an amount of about 1 to about 69 wt %, for example about 1 to about 60 wt %, as another example about 1 to about 50 wt %, as another example about 1 to about 40 wt %, and as another example about 1 to about 30 wt %, based on the total amount (total weight) of the thermoplastic resin composition. In some embodiments, the thermoplastic resin composition may include the branched copolymer including a silicon-based compound (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 wt %. Further, according to some embodiments of the present invention, the amount of the branched copolymer including a silicon-based compound (C) can be in a range from about any of the foregoing amounts to about any other of the foregoing amounts.

When the thermoplastic resin composition includes the branched copolymer including a silicon-based compound (C) in an amount within the above range, the thermoplastic resin composition may exhibit excellent fluidity and impact strength and simultaneously may exhibit excellent low gloss characteristic regardless of using no matting agent or a matting agent in a small amount.

(D) Styrene-Based Copolymer

The thermoplastic resin composition may further optionally include a styrene-based copolymer. This thermoplastic resin composition can have excellent fluidity and may exhibit a balance of properties as well as excellent conventional properties such as impact strength and the like.

The styrene-based copolymer may be a copolymer of a styrene-based monomer and an unsaturated nitrile monomer.

Examples of the styrene-based monomer may include without limitation styrene, α-methylstyrene, and the like, and combinations thereof.

Examples of the unsaturated nitrile monomer may include without limitation acrylonitrile, methacrylonitrile, and the like combinations thereof.

The styrene-based copolymer may include the unsaturated nitrile monomer in an amount of about 10 to about 40 wt %, and the styrene-based monomer in an amount of about 60 to 90 wt %, each based on 100 wt % of the copolymer of a styrene-based monomer and an unsaturated nitrile monomer.

The weight average molecular weight of the styrene-based copolymer is not particularly limited, but may be about 50,000 to about 200,000 g/mol.

The thermoplastic resin composition can include the styrene-based copolymer in an amount of about 0 to about 70 wt %, for example about 0 to about 60 wt %, as another example about 0 to about 50 wt %, as another example about 0 to about 40 wt %, and as another example about 0 to about 30 wt %, based on the total amount (total weight) of the thermoplastic resin composition. In some embodiments, the thermoplastic resin composition may include the styrene-based copolymer in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. As used herein, the term "about 0 wt %" means that some amount of the styrene-based copolymer is present. Further, according to some embodiments of the present invention, the amount of the styrene-based copolymer can be in a range from about any of the foregoing amounts to about any other of the foregoing amounts.

In exemplary embodiments, when the thermoplastic resin composition further includes the styrene-based copolymer, the thermoplastic resin composition may include about 30 to about 98 wt % of the polycarbonate resin (A), about 1 to about 50 wt % of the rubber modified acrylic-based graft copolymer (B), about 0.5 to about 65 wt % of the branched copolymer including a silicon-based compound (C), and about 0.5 to about 65 wt % of the styrene-based copolymer.

(E) Matting Agent

The thermoplastic resin composition may further optionally include a matting agent (E). This thermoplastic resin composition may effectively realize excellent low gloss characteristics. However, the thermoplastic resin composition may include no matting agent at all or a matting agent in a small amount but may still realize excellent low gloss characteristics.

The matting agent plays a role of forming subtle protrusions and depressions on the surface of a product during the injection molding and thus, scattering a light on the surface and suppressing gloss thereon.

The matting agent may be an inorganic compound and/or an organic compound. Examples of the inorganic compound may include without limitation silica, magnesium oxide, zirconia, alumina, titania, and the like, and combinations thereof. Examples of the organic compound may include without limitation a cross-linked vinyl-based copolymer. The vinyl-based monomer may include at least one monomer including styrene, acrylonitrile, methyl(meth)acrylate, ethyl (meth)acrylate, and/or butyl(meth)acrylate.

In one embodiment, the matting agent may be a cross-linked styrene-acrylonitrile copolymer.

The thermoplastic resin composition may include the matting agent in an amount of about 0 to about 8 parts by weight, for example about 0 to about 7 parts by weight, as another example about 0 to about 6 parts by weight, and as another example about 0 to about 5 parts by weight, based on about 100 parts by weight of the thermoplastic resin composition. In some embodiments, the thermoplastic resin composition may include the matting agent in an amount of about 0, 1, 2, 3, 4, 5, 6, 7, or 8 parts by weight. As used herein, the term "about 0 parts by weight" means that some amount of the matting agent is present. Further, according to some embodiments of the present invention, the amount of the matting agent can be in a range from about any of the foregoing amounts to about any other of the foregoing amounts.

(F) Other Additive(s)

The thermoplastic resin composition may further include one or more kinds of other additives in order to balance properties, or as needs of final uses. Examples of the other additive may include without limitation flame retardants, surfactants, nucleating agents, coupling agents, fillers, plasticizers, impact-reinforcing agents, lubricants, antibacterial agents, release agents, antioxidants, inorganic material additives, colorants such as pigments and/or dyes, anti-static agents, flame proofing agents, heat stabilizers, ultraviolet (UV) absorbers, ultraviolet (UV) blocking agents, adhesives, and the like, and may be used singularly or in a combination of two or more.

The other additive(s) may be included in a predetermined amount as long as it does not deteriorate the properties of the thermoplastic resin composition. In exemplary embodiments, the additives may be included in an amount of less than or equal to about 40 parts by weight, for example about 0.1 to about 30 parts by weight, based on about 100 parts by weight of the thermoplastic resin composition.

The thermoplastic resin composition may exhibit excellent low gloss characteristics, even though a matting agent is not used at all or used in a small amount as described above. In exemplary embodiments, the thermoplastic resin composition may have gloss of about 10 to about 60%, for example about 20 to about 50% of gloss at about 60°.

The thermoplastic resin composition may have excellent light resistance. The light resistance of the molded article is evaluated by using L, a, b, and ΔE used in a Lab color coordinate of Commission International de L'Eclairage (CIE). In the CIE Lab color coordinate, brightness is marked as L, and chromaticity indicating color and chroma is marked as a and b. As the a is larger (increases), a color is closer to red, and as the a is smaller (decreases), a color is closer to green. As the b is larger (increases), a color is closer to yellow, and the b is smaller (decreases), a color is closer to blue.

In the CIE Lab color coordinate, a color difference is indicated as delta E (ΔE). The ΔE is calculated according to the following Calculation Equation 1.

$$\Delta E = \sqrt{(\Delta L)^2 + (\Delta a)^2 + (\Delta b)^2}$$ [Calculation Equation 1]

As the ΔE is smaller, the color difference of the molded article is smaller, and therefore, the molded article shows improved light resistance.

ΔE to evaluate the light resistance of the thermoplastic resin composition is measured by using SAE J1885 standards under an exposure condition of 42 MJ/m$^2$, and may be less than or equal to about 2.0. That is to say, ΔE may be about 0 to about 2.0. This result shows that the molded article can have no color change but still ΔE in a low range despite long elapsed time. In addition, this shows that the thermoplastic resin composition realizes improved light resistance.

The above-described thermoplastic resin composition may be prepared by any well-known method of preparing resin compositions. For example, each component according to one embodiment of the present invention can be simultaneously mixed with other optional additives. The mixture can melt-extruded and prepared into pellets.

According to another embodiment of the present invention, a molded article manufactured using the thermoplastic resin composition is provided.

The molded article may be manufactured by various processes such as injection-molding, blow molding, extrusion molding, compression molding, and the like, using the thermoplastic resin composition.

The molded article may exhibit improved light resistance as well as improved mechanical properties such as impact strength and the like and heat resistance and thus, may be usefully applied to various outdoor electric/electronic parts, building materials, sport goods, auto parts, and the like.

Hereinafter, the present invention is illustrated in more detail with reference to the following examples and comparative examples. However, the following examples and comparative examples are provided for the purpose of illustration only, and the present invention is not limited thereto.

Examples 1 to 7 and Comparative Examples 1 to 5

Each pellet-shaped resin is prepared by mixing each components provided in the following Table 1 in an amount shown in the following Table 1 and then, extruding and processing the resultant composition. The extrusion is performed by using a twin-screw extruder having L/D=29 and a diameter of 45 mm and setting a barrel temperature at 250° C.

TABLE 1

|  |  | Example | | | | | | | Comparative Example | | | | |
| --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 |
| (A) polycarbonate |  | 78 | 78 | 78 | 78 | 78 | 78 | 78 | 78 | 78 | 78 | 78 | 78 |
| (B) rubber modified acrylic-based graft copolymer |  | 10 | 10 | 10 | 10 | 10 | 10 | 10 | 10 | 10 | 10 | 10 | 10 |
| (C) branched copolymer including silicon-based compound | (C-1) | 6 | 12 |  |  |  |  | 12 |  |  |  |  |  |
|  | (C-2) |  |  | 6 | 12 |  |  |  | 12 |  |  |  |  |
|  | (C-3) |  |  |  |  | 6 | 12 |  |  |  |  |  |  |
| (C') branched copolymer |  |  |  |  |  |  |  |  |  |  | 12 |  | 12 |
| (D) styrene-based copolymer |  | 6 |  | 6 |  |  |  |  | 12 | 12 |  | 12 |  |
| (E) matting agent |  |  | 3 | 3 | 3 | 3 | 3 |  | 5 | 3 | 3 |  |  |

In Table 1, (A) to (D) are used in a unit of wt %, and (E) is used in a unit of a part by weight based on the total weight of (A) to (D).

Each component in Table 1 is described as follows.

(A) Polycarbonate

A bisphenol-A based linear polycarbonate resin having a weight average molecular weight of about 25,000 g/mol is used.

(B) Rubber Modified Acrylic-Based Graft Copolymer 50 parts by weight of a monomer mixture of 25 wt % of acrylonitrile and 75 wt % of styrene are graft-copolymerized onto 50 parts by weight of a butylacrylate rubber, preparing a rubber modified acrylic-based graft copolymer having a core-shell shape and an average rubber particle diameter of about 180 nm in a conventional emulsion polymerization method.

(C) Branched Copolymer Including Silicon-Based Compound (C-1) A resin having a weight average molecular weight of 200,000 g/mol is prepared by using 73.7 wt % of styrene and 23.3 wt % of acrylonitrile with 1 wt % of a vinyl-modified dimethylsiloxane compound having viscosity of 100 cPs and including vinyl functional group in an amount of 0.5 mmol/g and 2 wt % of tetramethyltetravinylcyclotetrasiloxane in a conventional suspension polymerization method.

(C-2) A resin having a weight average molecular weight of 150,000 is prepared by using 73.7 wt % of styrene and 23.3 wt % of acrylonitrile with 1 wt % of vinyl-modified dimethylsiloxane compound having viscosity of 100 cPs and including vinyl in an amount of 0.5 mmol/g and 2 wt % of 2,4,6,8-tetramethyl-2,4,6,8-tetravinylcyclotetrasiloxane in a suspension polymerization method.

(C-3) A resin having a weight average molecular weight of 200,000 is prepared by using 73.7 wt % of styrene and 23.3 wt % of acrylonitrile with 3 wt % of a vinyl-modified dimethylsiloxane compound having a viscosity of 100 cPs and including vinyl functional group in an amount of 0.5 mmol/g in a suspension polymerization method.

(C') Branched Copolymer Resin

A resin having a weight average molecular weight 200,000 g/mol is prepared by using 75.95 wt % of styrene and 24 wt % of acrylonitrile with 0.05 wt % of divinylbenzene in a suspension polymerization.

(D) Styrene-Based Resin

A resin having a weight average molecular weight 150,000 g/mol is prepared by using 76 wt % of styrene with 24 wt % of acrylonitrile in a suspension polymerization method.

(E) Matting Agent

BLENDEX BMAT made by Galata Chemicals is used as a matting agent.

Evaluation Examples 1 to 4

The pellet is dried at 80° C. for 2 hours, and a specimen having a size of 9 cm×5 cm×0.2 cm and Izod specimens for impact strength testing are prepared by using the pellet and a 6 oz injection molding machine and then, setting a cylinder temperature at 250° C. and a mold temperature at 60° C. The specimens are used to measure properties in the following method, and the results are provided in the following Table 2.

Evaluation Example 1

Gloss

Gloss of the specimen is measured at about 60° in an evaluation method according to ASTM D523 standards. (unit: %)

Evaluation Example 2

Impact Strength (Izod)

Impact strength is measured by mounting a notch in a ⅛" Izod specimen according to ASTM D256 standards. (unit: kgf·cm/cm)

Evaluation Example 3

Fluidity (Melt Flow Index, MFI)

Fluidity of pellet is measured at 250° C. under a condition of 10 kg according to ASTM D1238 standards. (unit: g/10 min)

Evaluation Example 4

Light Resistance

Light resistance ($\Delta E$) is measured under an exposure condition of 42 $MJ/m^2$ according to SAE J1885 standards.

TABLE 2

|  | Examples | | | | | | | Comparative Examples | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Gloss (60°) | 29.7 | 21.4 | 30.5 | 25.6 | 33.5 | 47.7 | 52.0 | 30.6 | 46.1 | 45.9 | 94.7 | 92.8 |
| Impact strength | 56.8 | 61.9 | 57.3 | 59.6 | 55.5 | 63.9 | 62.1 | 53.6 | 56.0 | 54.1 | 66.6 | 63.8 |
| Fluidity | 34.6 | 32.4 | 36.5 | 34.3 | 35.7 | 32.4 | 33.3 | 33.2 | 33.9 | 27.9 | 35.8 | 28.2 |
| Light resistance ($\Delta E$) | 1.5 | 1.5 | 1.6 | 1.6 | 1.6 | 1.6 | 1.6 | 1.6 | 1.6 | 1.7 | 1.6 | 1.7 |

In Table 2, the gloss is measured as a unit of %, the impact strength is measured as a unit of kgf·cm/cm, and the fluidity is measured as a unit of g/10 min.

Referring to Table 2, the impact strengths according to Examples 1 to 7 are in a range of 56.8 to 63.9 kgf·cm/cm, the fluidity in a range of 32.4 to 36.5 g/10 min, $\Delta E$ in a range of 1.5 to 1.6, and the gloss in a range of 21.4 to 52.0%, showing that the impact strength, fluidity, light resistance, and low gloss characteristics are excellent.

In particular, Examples 1 to 5 using a matting agent in a small amount (3 parts by weight) or Examples 6 and 7 using no matting agent exhibit low gloss characteristics in an excellent range.

On the other hand, Comparative Example 1 includes more matting agent than Examples 1 to 5 to provide low gloss characteristics and thus exhibits deteriorated impact strength. Comparative Example 2 includes less matting agent to increase impact strength and exhibits higher gloss than Examples 1 to 5 and thus has unsatisfactory low gloss characteristic. Comparative Example 3 using a branched copolymer including no silicon-based compound has higher gloss than Examples 1 to 5 and low impact strength and fluidity. Comparative Examples 4 and 5 using no matting agent have a higher gloss than Examples 6 and 7 using a branched copolymer including a silicon-based compound, showing sharply deteriorated low gloss characteristics.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
   (A) about 30 to about 98 wt % of a polycarbonate resin,
   (B) about 1 to about 50 wt % of a rubber modified acrylic-based graft copolymer, and
   (C) about 1 to about 69 wt % of a branched copolymer including silicon-based compound, wherein the branched copolymer including a silicon-based compound (C) is a copolymer prepared by copolymerizing a mixture consisting of:
   (c1) about 10 to about 85 wt % of an aromatic vinyl-based monomer;
   (c2) about 10 to about 85 wt % of an unsaturated nitrile-based monomer; and
   (c3) about 0.1 to about 20 wt % of a silicon-based compound including at least two unsaturated reactive groups wherein the branched copolymer including the silicon-based compound (C) has a weight average molecular weight of about 50,000 to about 5,000,000 g/mol as measured by using gel permeation chromatography.

2. The thermoplastic resin composition of claim 1, wherein the aromatic vinyl-based monomer (c1) is styrene, p-methylstyrene, α-methylstyrene, halogen- and/or C1-C10 alkyl-substituted styrene, or a combination thereof.

3. The thermoplastic resin composition of claim 1, wherein the unsaturated nitrile-based monomer (c2) is acrylonitrile, methacrylonitrile, ethacrylonitrile, phenylacrylonitrile, α-chloroacrylonitrile, or a combination thereof.

4. The thermoplastic resin composition of claim 1, wherein the silicon-based compound including at least two unsaturated reactive groups comprises a silicon-based compound represented by the following Chemical Formula 2, singly or as a mixture thereof:

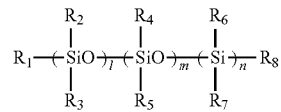

[Chemical Formula 2]

wherein, in the above Chemical Formula 2,
l, m, and n are the same or different and are each independently an integer ranging from 0 to 100, with the proviso that l, m, and n are not 0 simultaneously,
$R_1$ to $R_8$ are the same or different and are each independently hydrogen, substituted or unsubstituted C1 to C30 alkyl, substituted or unsubstituted C2 to C30 alkenyl, substituted or unsubstituted C2 to C30 alkynyl, substituted or unsubstituted C3 to C30 cycloalkyl, substituted or unsubstituted C6 to C30 aryl, substituted or unsubstituted C1 to C30 heteroaryl, a hydroxy group, alkoxy, an amino group, an amide group, an epoxy group, a carboxyl group, a halogen, an ester group, an isocyanate group, or a mercapto group, wherein at least two of the $R_1$ to $R_8$ include a polymerizable unsaturated reactive group.

5. The thermoplastic resin composition of claim 1, wherein the silicon-based compound including at least two unsaturated reactive groups comprises dimethoxymethylvinylsilane, diethoxymethylvinylsilane, diacetoxy methylvinylsilane, 1,1,1,3,5,5,5-heptamethyl-3-vinyltrisiloxane, 2,4,6,8-tetramethyl-2,4,6,8-tetravinylcyclotetrasiloxane, polydimethylsiloxane, vinyl-modified dimethylsiloxane, or a combination thereof.

6. The thermoplastic resin composition of claim 1, wherein the thermoplastic resin composition further comprises a styrene-based copolymer (D).

7. The thermoplastic resin composition of claim 1, wherein the thermoplastic resin composition further comprises a matting agent (E).

8. The thermoplastic resin composition of claim 1, wherein the thermoplastic resin composition has gloss of about 10 to about 60% at about 60°.

9. The thermoplastic resin composition of claim 1, wherein the thermoplastic resin composition has ΔE of about 0 to about 2.0 measured by using SAE J1885 standards under an exposure condition of 42 MJ/m² in order to evaluate light resistance.

10. A molded article using the thermoplastic resin composition of claim 1.

* * * * *